United States Patent

Bauer et al.

[11] Patent Number: 6,030,042
[45] Date of Patent: Feb. 29, 2000

[54] MOTOR VEHICLE SEAT WITH A BACK REST, WHICH CAN BE TILTED FORWARD AND A SEAT CARRIER, WHICH CAN BE TILTED FORWARD

[76] Inventors: Heinz Bauer, Hammerstr. 9, 42699; Burckhard Becker, Obenkatternberg 25, 42655; Ernst-Reiner Frohnhaus, Hammerstr. 13, 42699, all of Solingen; Wilhelm Wingensiefen, Sellscheid 44, 42929, Wermelskirchen, all of Germany

[21] Appl. No.: 09/097,936

[22] Filed: Jun. 16, 1998

[30] Foreign Application Priority Data

Jun. 16, 1997 [DE] Germany .............................. 197 25 365

[51] Int. Cl.[7] ...................................................... B60N 2/00
[52] U.S. Cl. ........................................... 297/341; 297/340
[58] Field of Search ..................................... 297/316, 341, 297/340, 378.1, 378.12, 311, 319, 322, 344.14, 344.15, 344.1

[56] References Cited

U.S. PATENT DOCUMENTS

| | | | |
|---|---|---|---|
| 4,269,446 | 5/1981 | Gersmann et al. ....................... | 297/341 |
| 4,312,537 | 1/1982 | Lindenberg ........................... | 297/341 X |
| 4,846,520 | 7/1989 | Acuto et al. ......................... | 297/341 X |
| 4,973,104 | 11/1990 | Nakayama et al. ..................... | 297/341 |
| 5,873,629 | 2/1999 | Schuler .................................... | 297/341 |

FOREIGN PATENT DOCUMENTS 734969  8/1955  United Kingdom ................... 297/341

*Primary Examiner*—Milton Nelson, Jr.
*Attorney, Agent, or Firm*—Thorp Reed & Armstrong, LLP

[57] ABSTRACT

A motor vehicle seat comprising a seat carrier, which is connected on one hand via a height adjustment device, to which belongs a back link, with an underframe and to which on the other hand a back rest support of a back rest is arranged, which on one hand is coupled via a joint to the seat carrier and on the other hand is normally connected via a detachable stop device with a seat carrier in such a way that after the stop device has been released the back rest is moved around the joint in a swinging motion and can thereby be shifted forward. At the same time a locking device has been released, which is preferably allocated to the back link. The seat carrier can be shifted forward in such a way that on the whole the space behind the motor vehicle seat is made larger and the access to this space is made easier. The back rest support has an extension, which extends the back rest support over the joint. A tension bar, which is not resistant to pressure acts upon the extension on one hand and on the other hand at the back link that is designed in such a way that when tilting up the back rest, which is shifted forward, the tension bar, which is resistant to pressure, effects a tensile force onto the back link and thereby the seat carrier, which is also shifted forward is tilted back at the same time.

10 Claims, 1 Drawing Sheet

MOTOR VEHICLE SEAT WITH A BACK REST, WHICH CAN BE TILTED FORWARD AND A SEAT CARRIER, WHICH CAN BE TILTED FORWARD

BACKGROUND OF THE INVENTION

1. Field of the Invention

This invention relates to a motor vehicle seat with a seat carrier, which is connected to a height adjustment device, having a back link, with an underframe, a back rest having a back rest support which is coupled via a joint to the seat carrier and is connected via a detachable stop device with the seat carrier in such a way that after the stop device has been released the back rest is swung around the joint and thereby can be shifted forward and, at the same time, after a locking device which is allocated to the back link has been released, the seat carrier can be shifted forward in such a way that on the whole the space behind the motor vehicle seat is enlarged and the access to this space is made easier.

2. Description of the Related Art

One type of motor vehicle seat is described in DE 28 13 534 Al. This type of seat carrier is connected on each side of the seat via a front link and a back link to an underframe, which is constituted by longitudinal guides, which serve the purpose of the length adjustment and which are connected to an understructure of the body of the motor vehicle. A locking device is allocated to the back link, which allows the upper joint of the back link to be fixed and released. The detachable stop device is a handle, which normally encompasses a bolt and is fixed at a joint to the seat carrier. When shifting the backrest forward, the seat carrier is also taken forward. However, when the backrest is shifted from the forward position to the back, the corresponding motion of the seat carrier is not supported however. This is a disadvantage.

Motor vehicle seats having a seat carrier and a backrest, which can be shifted forward, are especially suitable for those motor vehicles, with which easy access to the space behind the motor vehicle seat is desirable, such as, two-door motor vehicles wherein one has to gain access to the space behind the driver or the front passenger seats via the front door. The already described shifting forward is performed for making the access to the rear seats easier. The back rest serves the purpose of a handle during the shifting forward in that it constitutes a lever with a fairly long lever arm.

SUMMARY OF THE INVENTION

It is in the task of the invention to further develop the motor vehicle seat of the above-mentioned kind in such a way that when tilting the back rest from the shifted forward position into the normal position, the seat carrier is then also shifted back into its normal position. The back rest support of the motor vehicle seat has an extension, which extends the back rest support beyond the joint with the seat carrier such that a tension bar, which is not resistant to pressure acts upon the extension on one hand and on the other hand at the back link and it is designed in such a way that when tilting up the back rest, which is shifted forward, the seat carrier, which is also shifted forward, is tilted back at the same time.

With such a motor vehicle seat, the return of the seat carrier from the shifted forward position into the position of normal use is achieved or at least supported by the tension bar, which is resistant to pressure. When the back rest is titled back from the shifted forward position, the tension bar which is arranged at the extension of the back rest support and which embodies a tension onto the back link, tightens and leads to a setting upright and thereby to a tilting back of the seat support.

A connection motion is achieved with the tilting backward motion via a relatively simple means, namely a tension bar, which is not resistant to pressure, and that be embodied for example as a pair of two stiff levers that are linked in a hinge joint with each other or that can also be embodied as a rope. By this the mechanism for returning the backrest, which has been shifted forward, and the seat carrier is remarkably simplified. In a preferred embodiment, the seat carrier is stressed via elastic means in such a way that it automatically shifts forward after the release of the locking device. In another preferred embodiment, a tension spring is provided, which acts upon the back link on one hand and on the other hand upon the underframe. As soon as the locking device, which is allocated to the back link for example but may also be allocated to the front link, is released, the tension spring aids in the shifting forward of the back rest and the shifting forward of the seat carrier at the same time and results in an easy shifting forward of both parts for the use.

This remarkable simplification of the procedure of shifting forward both parts due to the spring has the disadvantage, however, that the resetting movement into the normal state of the motor vehicle seat is aggravated, because one has to work against the power of the elastic means, namely against the tension spring. Here a tension bar, which is resistant to pressure, is of use. Part of the readjusting forces, which are induced into the motor vehicle seat via a large arm of the backrest by a user, is used for the purpose of moving the seat carrier backward. The combination of the already mentioned piece of elastic means and the tension bar, which is resistant to pressure results in a remarkable simplification of the practical use of the motor vehicles seat according to the invention.

In another preferred embodiment, a back rest mounting is arranged between the joint and the detachable stop device on one hand and an upholstery body of the back rest on the other hand, in such a way that the back rest is divided into a lower arm and an upper arm so that an individual adjustment of the backrest against the seating area is achieved with known means. The function of shifting forward is not impaired by this in any way. The further the back rest is tilted towards the back by means of the back rest mounting, the more advantageous it is to shift the seat carrier forward to gain access to the space behind the driver's seat.

In a preferred embodiment, the tension bar, which is not resistant to pressure, is a rope. By means of the rope the function of the tension bar according to the invention, which is not resistant to pressure, can be easily explained. The tension bar is only used, if the seat carrier remains in the shifted forward position when readjusting the seat to its normal position. When the seat back is readjusted, the tension bar tightens and effects a pulling of the seat carrier. In the normal state of use of the seat, the tension bar is relaxed and has no influence on the relative position of the backrest and the seat carrier. Also when shifting forward the backrest and the seat carrier the tension bar is not needed.

In a preferred embodiment, an arrangement of two normally rigid lever arms is inserted, which are freely linked with each other in a hinge joint. One of the two lever arms is connected with the joint of the extension at its free end, the other one is coupled to the back swing at its free end. It has proven to be advantageous to use a point of coupling, which is slightly closer to the upper hinge point of the back link than its lower hinge point.

Further advantages and characteristics of the invention derive from the other claims as well as the following description of a non-restrictive embodiment of the invention, which is illustrated further with regard to the drawings. This drawing shows in:

BRIEF DESCRIPTION OF THE DRAWINGS

The following figures describe the present invention in which.

DETAILED DESCRIPTION OF THE PREFERRED INVENTION

Figure 1:
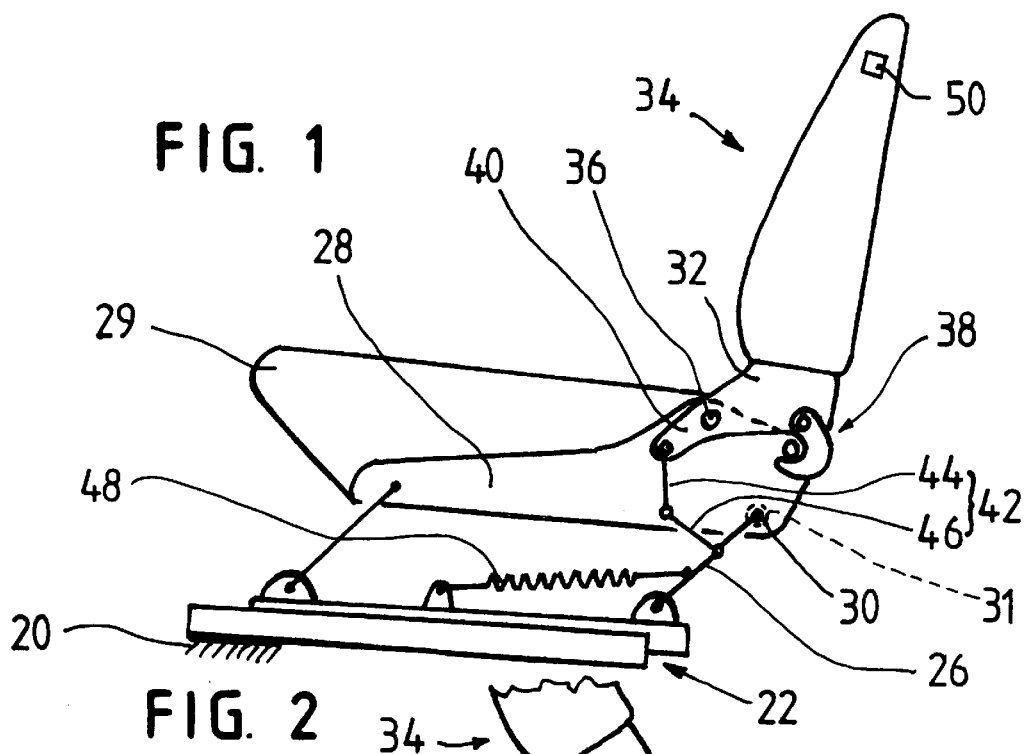
FIG. 1 is a side view of a motor vehicle seat in its normal position of use.

In a manner already known, the motor vehicle seat is attached to an understructure of the body 20, the direct attachment occurs via two bottom carriers 22, which form the underframe of the carriage. The respective upper carrier is connected at the front with a front link 24 and in the rear area with a back link 26, which are coupled themselves to a seat carrier 28 and constitute the essential components of a height adjustment device. The four-bar linkage, which is constituted in such a way, can be adjusted for example at the upper hinge point 30 of the back link 26 by a detachable locking device 31. Such devices are generally known and are therefore not illustrated here individually. The adjustment occurs for example via a tooth segment with a detent pawl, which is embodied accordingly, or a similar mechanism.

Figure 2:
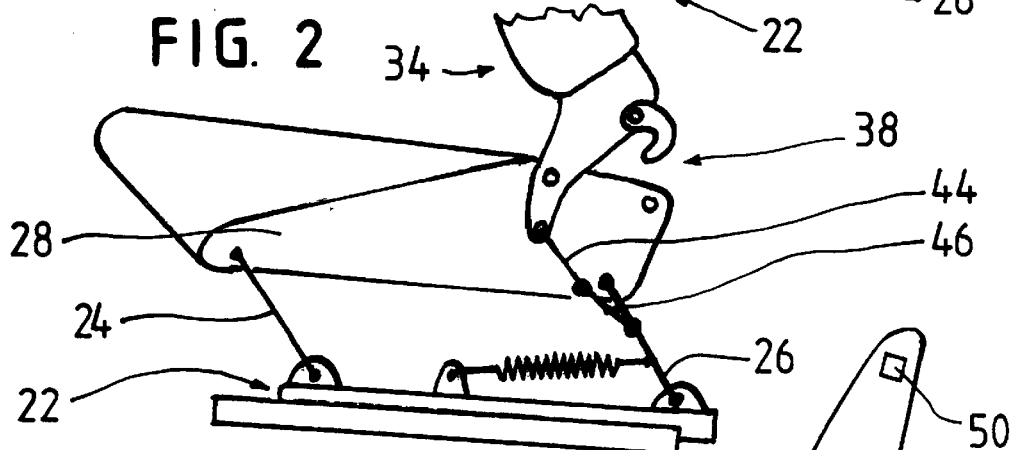
FIG. 2 is an illustration according to FIG. 1, having the back rest shifted forward and the seat carrier shifted forward.

A backrest support 32 of a backrest 34 is arranged at the seat carrier 28. The backrest 34 has an upholstery body 29. The back rest support 32 is coupled on one hand via a joint 36 at the seat carrier and it can be swung around this joint 36, as will be explained further in the following, and on the other hand, it is normally connected with the seat carrier 28 via a detachable stop device 38. In the illustrated embodiment, the detachable stop device 38 is a handle, which is arranged at the back rest support in a swinging manner, and an abutment in the shape of a stay bolt for this handle. The handle normally fastens the stay bolt (by a single flange), as illustrated in FIG. 1. It can be released from the stay bolt after a backward swinging motion, as can be seen in FIG. 2. Accordingly, after releasing the stop device 38 the backrest 34 can be swung around the joint 36 and thereby shifted forward. If the locking device 31 is released at the same time, then the seat carrier 28 can be shifted forward. Thereby the space behind the driver's seat is made larger and the access towards this space is made easier. The invention is thereby especially suited for two-door motor vehicles, for example, coupes, which have rear seats, but wherein the access to the rear seats can only be gained via the front doors. The shifting forward of the seat carrier 28 and the tilting forward of the back rest 34 can be performed in a relatively easy manner and the access to the space behind the motor vehicle seat is thereby quickly provided.

The backrest support has an extension 40. It extends the backrest carrier 32 beyond joint 36. In the embodiment, the extension is placed on the other side of the joint 36 at the coupling point for the handle. In the normal position of the backrest support 32, as illustrated in FIG. 1, the extension 40 extends diagonally downward toward the front of the upper carrier (seat carrier).

A tension bar 42, which is not resistant to pressure, is provided, which connects the extension 40 and the back link 26. In the illustrated embodiment the tension bar is embodied by two rigid links, 44, 46 which are linked by a hinge joint whereby the link 44, is coupled with extension 40, while the other link 46 is coupled with the back link 26. It acts upon the back link in a hinge point, which is essentially positioned in the center of the back link 26, but which is slightly shifted upwards, for example 10 to 20% out of the center. As is illustrated in FIG. 1 in its normal position the tension bar 42 is not tightened. The two links 44, 46 are not stretched. When stretched the distance between the final ends of the links would be larger than the distance apparent in FIG. 1. As shown in FIG. 1, the distance between the final ends of the links in the unstretched position is about 10 to 40%, preferably 15 to 30% less than the total distance between the final ends when the links are stretched.

A tension spring 48, which supports itself with an end attached to a lower carrier, acts upon the back link 26. This tension spring 48 stresses the back link and therefore, the entire four-bar linkage in such a way that the seat carrier 28 is prestressed in an elastic manner towards the front against the pair of carriers 22. If the locking device 31 is released, then the seat carrier 28 either shifts forward all by itself based on the effect of the tension spring 48, or also shifts forward being acted upon by a user. This is illustrated in FIG. 2.

If, based on the state in FIG. 1, the locking device 31 is released and at the same time the handle of the stop device 38 swings in a clear manner, then the back rest 34 swings to the front based on a force, which is induced by a user and/or by an additional elastic support, and at the same time the seat carrier 28 swings towards the front based on the swinging motion, which is induced by the user and/or by the force of the tension spring 48 which is illustrated in FIG. 2. In this state the motor vehicle seat is in a position which is shifted extensively to the front and the space behind the motor vehicle seat is free for gaining access to the rear seats.

It has proven to be advantageous to combine the operations of releasing the locking device 31 and the free swinging of the handle of the stop device 38, to be released by a single hand lever 50, which is preferably arranged in the upper area of the back rest 34. After releasing the handle 50 the two locking devices remain unlocked until the seat has reached the normal position again according to FIG. 1, then the locking device 31 engages and the handle engages its abutment again and the seat is locked again.

It is proven to be advantageous to stress the backrest 34 by elastic means toward the front. For this purpose a tension spring may be arranged in a parallel manner to the tension bar 42. A leg spring around the joint may also take over the function of the elastic prestress of the backrest 34 towards the front.

Figure 3:
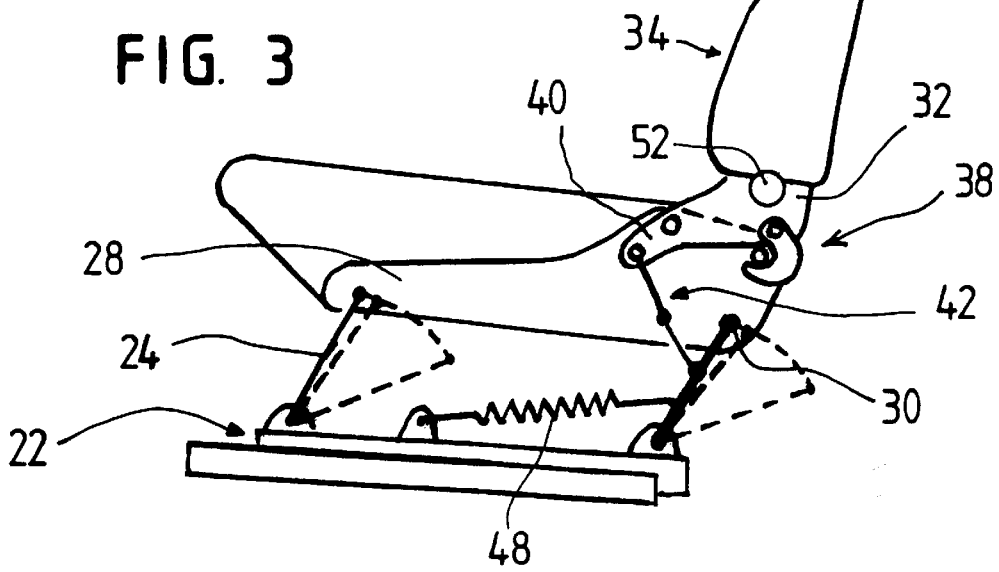
FIG. 3 is an illustration according to FIG. 1, having the back rest illustrated at an intermediate stage of the backward motion thereof and the seat carrier in the normal position according to FIG. 1.

According to FIG. 2, the seat has to be moved in a swinging motion to the back by a user, who has to act by using the respective force. Thereby, the user preferably acts at the upper edge of the backrest 34 and guides the backrest towards the back again. Based on the elastic prestress the carrier 28 stays back. When tilting the backrest 34 further, the tension bar 42 tightens, the respective state is illustrated in FIG. 3. From this point onwards, namely after the tension bar 42 has been tightened, resetting the backrest 34 effects a pulling of the seat carrier 28 the same is pulled again into the position, which it was at the starting point, namely according to FIG. 1.

In FIG. 3, a back rest mounting 52 is shown, that enables an adjustment of the upper arm of the back rest support, which is positioned above it against the lower arm and thereby an allowing angle adjustment of the upholstery body of the back rest 34. The extension 40 is positioned at the lower arm.

A rope may also act as a tension bar. Especially, a tension spring, which is limited by respective measures in its manufacture. For example, a clip or a rope may act as a tension bar 42. It provides the already mentioned elastic prestress of the back rest towards the front and effects the pulling of the seat carrier 28 on the way back based on the limitation of the pulling force.

We claim:

1. A motor vehicle seat comprising a back rest and a seat carrier, said seat carrier is connected via a height adjustment device, to which is attached a back link, with an underframe, a back rest support of said back rest is positioned adjacent to said seat carrier, said back rest support is coupled via a joint to said seat carrier, said back rest support is further connected via a detachable stop device with said seat carrier in such a way that after said detachable stop device has been released said back rest can be swung around said joint and thereby said back rest can be tilted forward and at the same time after a locking device has been released said seat carrier can be shifted forward, in such a way that a space behind said motor vehicle seat is made larger and an access to said space is made easier, wherein said back rest support has an extension, which extends said back rest support beyond said joint and a tension bar is provided, which tension bar is not resistant to pressure, which tension bar acts upon said extension, which tension bar acts upon said back link, and which tension bar is designed in such a way that when tilting said back rest upright, starting from a shifted forward position of said back rest said tension bar effects a tensile force onto said back link so that said seat carrier is shifted backwards together with said back rest.

2. The motor vehicle seat according to claim 1, wherein said locking device is operable with said back link.

3. The motor vehicle seat according to claim 1, wherein said detachable stop device includes a handle at said back rest support and an abutment for said handle at said seat carrier.

4. The motor vehicle seat according to claim 1, wherein said back rest support is divided in a lower arm of said back rest support and an upper arm of said back rest support, a back rest mounting for the angle adjustment of said back rest is arranged between said lower arm and said upper arm, said joint and said detachable stop device are located on said lower arm, said upper arm is connected with an upholstery body of said back rest.

5. The motor vehicle seat according to claim 1, wherein said tension bar is a rope.

6. The motor vehicle seat according to claim 1, wherein said tension bar is an arrangement made of two links, said two links are rigid and said two links are linked to each other in a hinge joint, one of said two links is coupled at said extension, and the other one of said two links is coupled at said back link.

7. The motor vehicle seat according to claim 1, wherein said back link comprises a lower hinge point, at which lower hinge point said back link is connected with said underframe, and an upper hinge point, with which said back link is connected with said seat carrier, said tension bar acts upon said back link in an area between said lower hinge point and said upper hinge point.

8. The motor vehicle seat according to claim 7, wherein said area is slightly closer to said upper hinge point than said lower hinge point.

9. The motor vehicle seat according to claim 1 wherein said seat carrier is prestressed by an elastic means in said shifted forward position.

10. The motor vehicle seat according to claim 9, wherein said elastic means is a tension spring, said tension spring having an end connected at said underframe and an end acting upon said back link.

* * * * *